(12) United States Patent
Rudolph et al.

(10) Patent No.: US 6,492,744 B1
(45) Date of Patent: Dec. 10, 2002

(54) STEERING COLUMN SWITCH FOR A MOTOR VEHICLE

(75) Inventors: Gerd Rudolph, Aspisheim (DE); Joseph E. Khoury, Farmington, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/269,702

(22) PCT Filed: Sep. 25, 1997

(86) PCT No.: PCT/DE97/02203

§ 371 (c)(1),
(2), (4) Date: Jul. 6, 1999

(87) PCT Pub. No.: WO98/14347

PCT Pub. Date: Apr. 9, 1998

(30) Foreign Application Priority Data

Oct. 1, 1996 (DE) .......................................... 196 40 501
Jan. 4, 1997 (DE) .......................................... 197 00 175

(51) Int. Cl.[7] .............................................. B60R 21/16
(52) U.S. Cl. ...................... 307/10.1; 307/9.1; 307/10.8; 230/731; 230/727
(58) Field of Search .......................... 200/61.54–61.57, 200/293–307, 61.27–61.35; 180/333, 334; 307/10.1–10.8, 9.1; 280/727

(56) References Cited

U.S. PATENT DOCUMENTS

| | | | | |
|---|---|---|---|---|
| 5,575,177 A | * | 11/1996 | Poleschuk et al. | 200/61.3 |
| 5,780,796 A | * | 7/1998 | Uchiyama et al. | 200/61.54 |
| 5,804,785 A | * | 9/1998 | Uchiyama | 200/61.54 |
| 5,848,540 A | * | 12/1998 | Pieper | 70/252 |
| 5,883,348 A | * | 3/1999 | Yokoyama | 200/61.54 |
| 6,183,005 B1 | * | 2/2001 | Nishijima et al. | 200/61.57 |

* cited by examiner

*Primary Examiner*—Brian Sircus
*Assistant Examiner*—Robert L. Deberadinis
(74) *Attorney, Agent, or Firm*—Thomas N. Twomey

(57) ABSTRACT

An automobile steering column switch includes a support rigidly mounted to the steering column tube of an automobile steering column. The support comprises at least one of a wiper switch, blinker switch, and driving light switch. The support includes a printed circuit board provided with electrical contacts to which the at least one of a wiper switch, blinker switch and driving light switch and an ignition starter switch are coupled. The support is configured in one piece and provided with an accommodation space for the ignition starter switch. The support with the switches can be mounted as a pre-assembled module to the steering column 2.

13 Claims, 5 Drawing Sheets

STEERING COLUMN SWITCH FOR A MOTOR VEHICLE

FIELD OF THE INVENTION

The invention herein relates to an automobile steering column switch comprising a support, which can be mounted to a steering column tube of an automobile steering column, said support having arranged on it at least one wiper switch and/or blinker switch and/or driving light switch.

BACKGROUND OF THE INVENTION

As has been known, motor vehicles consist of a plurality of complex construction assemblies, whereby the steering column switch assembly to be installed on the steering column tube of the motor vehicle represents an important feature.

Typically, steering column switches are mounted in radial direction relative to the steering column on the steering column's steering column tube, thereby rendering the steering column switch immobile relative to the steering wheel when the steering wheel and hence the steering column guided inside the steering column tube are moved. As a rule, the steering column switch comprises a blinker switch and a driving light switch, in which case the driving light switch frequently is configured as a rotary switch being an integral part of the switch lever of the blinker switch. Furthermore, the steering column switch frequently comprises a wiper switch for graduated activation of the windshield wipers and activation of the switch functions for the windshield washer system. For example, such steering column switches have been known from DE Auslegeschrift 2,810,790 and DE Patent 3,532,532 C2.

Every steering column switch comprises a plurality of interacting components that perform a large number of switch functions. These components are accommodated in an extremely small space and, therefore, make the construction of the steering column switch complex. Therefore, depending on the type of vehicle, individual components are more or less pre-assembled and subsequently mounted to a support located on the steering column tube of the steering column.

A similar situation exists in the case of an ignition starter switch with integrated steering lock because the ignition starter switch frequently performs two additional switch functions such as, for example, activation of an immobilizer cooperating with a transponder integrated in the ignition key. As a result, ignition starter switches are becoming more and more complex because integrated code-recognition systems are to protect the vehicle against unauthorized use.

The two assemblies, namely the steering column switch and the ignition starter switch, are mounted separately to the steering column tube at the time the motor vehicle is assembled, whereby, in most cases, the ignition starter switch is located at a distance from the steering column switch. However, considering the viewpoint of technology, the automobile industry has demanded reduced assembly times for motor vehicles, in particular on the assembly line.

The problem to be solved by the invention herein is to provide an automobile steering column switch of the above-described type, in which case said switch can be pre-assembled practically completely and can incorporate the switch functions of an ignition starter switch.

SUMMARY OF THE INVENTION AND ADVANTAGES

In accordance with the invention herein, this problem has been solved in that the support comprises an integrated printed circuit board provided with electrical contacts to which the switch functions relating to the wiper switch and/or blinker switch and/or driving light switch and an ignition starter switch can be transferred, said support is configured in one piece with an accommodation space for the ignition starter switch, and said support can be mounted, together with the switches, as pre-assembled module to the steering column tube.

Consequently, the support of the steering column switch not only accommodates the printed circuit board for performing the switch functions of the steering column switch and the ignition starter switch but also is configured in such a manner that it can accommodate the ignition starter switch. Therefore, all of the switch functions combined are transferred as one single function to the printed circuit board provided in the steering column switch. As a result, it is no longer necessary to install a plurality of electrical cables in the steering column switch, said cables taking up an unnecessary amount of space and being prone to trouble. In addition, the electrical cable connections of the ignition starter switch are eliminated because its switch functions are now transferred directly to the printed circuit board on the support. The particular advantage of this is that the pre-assembled ignition starter switch can be inserted in one piece in the respective accommodation space on the support of the already pre-assembled steering column switch. The steering column switch may then be mounted in the form of a module to the steering column of the motor vehicle. Consequently, this reduces the number of required components, the required assembly facilities, as well as the assembly time on the assembly line during the preliminary and final assemblies of the motor vehicle. Therefore, a separation of mechanical and electrical assembly functions has been created.

As an alternative, this problem has also been solved in that—the support comprises a printed circuit board with electrical contacts, to which the switch functions relating to the wiper switch and/or the blinker switch and/or the driving light switch, as well as an ignition starter switch, can be transferred, the support can be mounted as pre-assembled module to the steering column tube, and the ignition starter switch can be mounted as a pre-assembled module to the steering column tube, separately from the support, by means of a clamp connection.

Considering the printed circuit board and the combination of the switch functions of the steering column switch in conjunction with the ignition starter switch, this alternative solution offers the same advantages as the first solution. While in this case the ignition starter switch is not directly integrated in the support of the steering column switch, but rather mounted as a separately pre-assembled component on the steering column tube of the steering column in close proximity of the steering column switch, the switch functions of the ignition starter switch can be transferred directly to the printed circuit board mounted to the support due to its close proximity to this support. In order to simplify the assembly effort relating to the ignition starter switch provided as separate module and to allow fast assembly, the clamp connection consists of a clamp overlapping the steering column tube and a corresponding counter-clamp adjoining the ignition starter switch. In this case the clamp overlapping the steering column tube is connected with the counter-clamp on the ignition starter switch by means of screws. Due to this, only a few hand movements are required to mount the ignition starter switch quickly to the steering column tube.

In the case of an advantageous embodiment of the invention herein the wiper switch and/or blinker switch and or driving light switch are mounted to the support by means of clip connections. These become a fixed integral part of the support simply by inserting the switch in the respective accommodation space on the support. As a result, these clip connections may be released conveniently for repair and maintenance purposes, thereby permitting the quick and easy removal of the switches from their respective accommodation spaces.

In order to reduce assembly efforts even further, one modification of the invention herein provides that the support be mounted in position to the steering column tube by means of a clip connection or bayonet connection, whereby the support rests on a ball-bearing located on the steering column. This ball-bearing is placed in the support of the steering column switch during preliminary assembly and placed on the steering column at the time of assembly in such a manner that, due to the clip connection or bayonet connection between the support and the steering column tube, the steering column switch is mounted rigidly on said steering column tube.

In accordance with another modification of the solutions offered by the invention herein the electrical contacts of the printed circuit board are configured as micro-switches. These micro-switches can have multiple functions, be subjected to frequent use, and are resistant to mechanical stress and distinguished by high reliability. As an alternative, as has been well known, the said electrical contacts of the printed circuit board may be configured as switch contacts or the like.

In order to be able to convert switch functions transferred to the printed circuit board in an effective manner, the circuit board is connected with a computer-controlled electronic control system of the automobile. In addition, the printed circuit board is covered with a lid that is mounted to the support. As a result of this, the printed circuit board is protected against outside influences such as damage caused by moisture and dust.

Frequently, switch contacts located inside the steering column switch are subject to corrosion or breakage due to excessive use. To prevent this and achieve greater reliability, the ignition starter switch preferably comprises a cam control activated by means of a key, said cam control acting on the electrical contacts of the printed circuit board. Therefore, different configurations of the cams activate different switch functions that are transferred to the printed circuit board in the support of the steering column switch.

It is useful if the support incorporates an electrical transfer system for an airbag device. As a rule, this type of transfer system comprises a helical volute buffer spring used as electrical connection element between two parts, which move relative to each other; this is the case with a steering wheel containing an airbag and moving relative to the steering column switch. In as much as the electrical transfer system is also an integral part of the pre-assembled steering column switch module, the assembly effort is reduced even further.

BRIEF DESCRIPTION OF THE DRAWINGS

The invention will be explained in detail hereinafter with reference to two examples of embodiment.

FIG. 2b is a perspective partial view of the steering column switch of FIG. 2, which is to be mounted to the steering column of an automobile.

Figure 1:
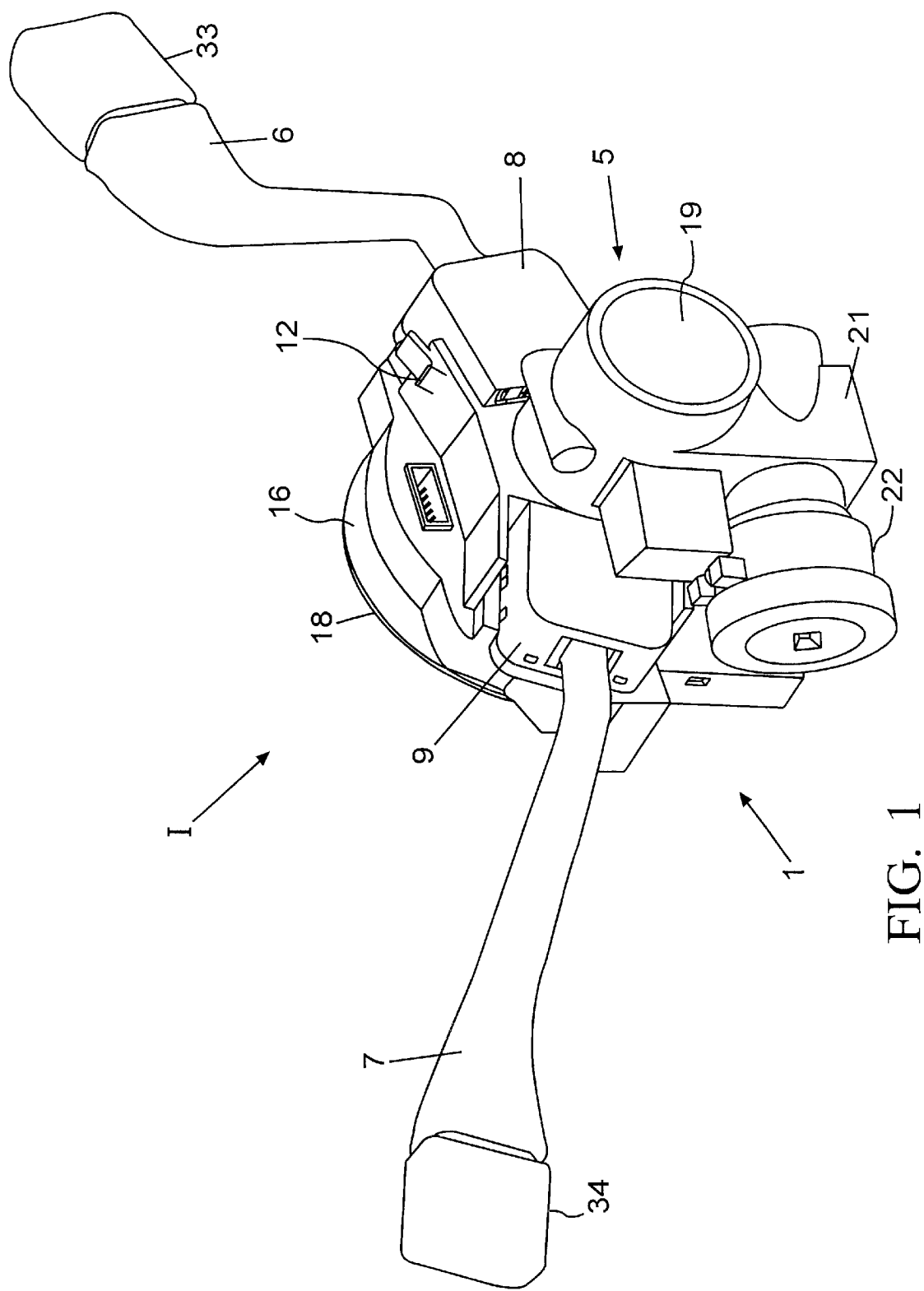
FIG. 1 is a perspective rear view of a steering column switch in accordance with the invention herein.

In each of the drawings, arrow I indicates the vehicle driver's direction of view of steering column switch 1, which is mounted to a non-torsionally mounted rigid steering column tube accommodating a steering column 4 guided in a torsional manner. The major component of said steering column switch is a one-piece support 5. In addition, steering column switch 1, as viewed by the driver of the vehicle, comprises on the left side a blinker switch 8 with its switch lever 6 to indicate the driving direction, whereby switch lever 6 of blinker switch 8 incorporates driving light switch 33, which is configured as a rotary switch. To the right is steering column switch 1 with a wiper switch 9 with its switch lever 7 for the windshield wiper, whereby switch lever 7 of wiper switch 9 incorporates a rotary momentary-contact switch 34 for different intermittent stages of windshield wiper activation and activation of the windshield washer system. Blinker switch 8 and wiper switch 9 each have external release buttons 10 forming a clip connection 12 with corresponding receiving elements 11 in support 5, when blinker switch 8 and/or wiper switch 9 are moved into support 5. In addition, both blinker switch 8 and wiper switch 9 comprise a switch member 13 extending radially toward the inside.

Support 5 comprises an electronic module 14, which, for example, recognizes the parking position in a vehicle with automatic transmission and performs a corresponding locking function. Also, seen in the driver's direction of view (arrow I), support 5 comprises in front of blinker switch 8 and wiper switch 9 a printed circuit board 15 with several micro-switches MS. Micro-switches MS can be activated by switch elements 13 of blinker switch 8 and wiper switch 9 and, in so doing, perform their respective switch functions. Printed circuit board 15 is provided with an electronic multiplexing system, an electronic immobilizer, or the like, and connected with a not-illustrated computer-controlled electronic automobile control system. A lid 16 mounted to support 5 covers printed circuit board 15 to protect it against outside influences. Lid 16 accommodates a transfer system 17 comprising an electrical volute buffer spring, said system representing an electrical conductor and as such part of a not-illustrated airbag device in the steering wheel of the automobile. Electrical transfer system 17 is covered by a cover plate 18 mounted to lid 16.

Furthermore, support 5, printed circuit board 15, lid 16 and cover plate 18 are provided with a central opening 19 in which steering column tube 3 is inserted. Opening 19 of support 5 accommodates a ball-bearing 20 that is placed on steering column 4 at the time support 5 is mounted. Also, as indicated in FIG. 2, support 5 comprises a bayonet connection B, which is brought into engagement with steering column tube 3 of steering column 4.

Figure 1A:
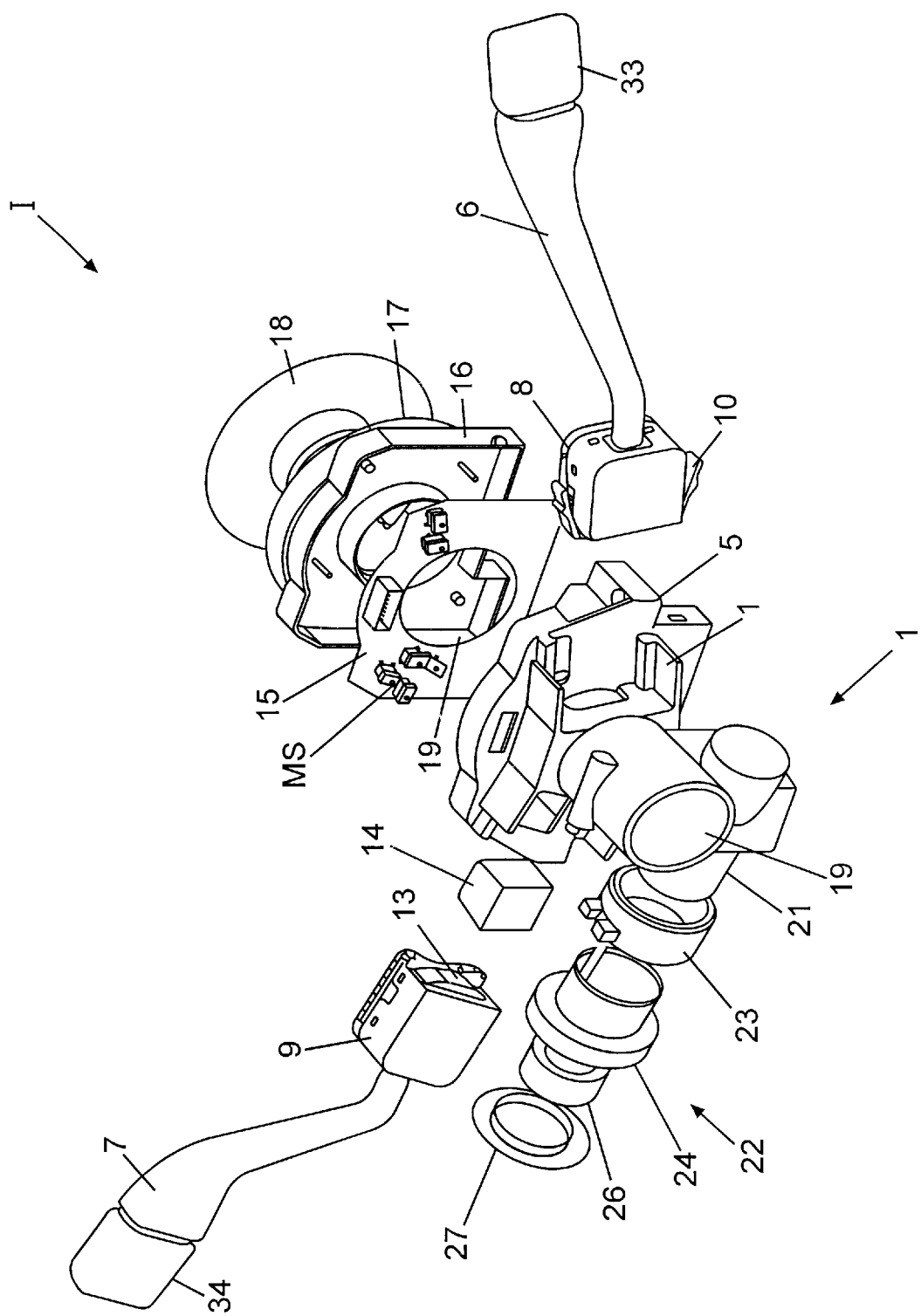
FIG. 1a is an exploded view of the steering column switch in accordance with FIG. 1.

In accordance with the form of embodiment of steering column switch 1 as shown by FIG. 1 and FIG. 1a, support 5 has an integral adjoining accommodation space 21 for an ignition starter switch 22. Ignition starter switch 22 comprises a control ring 23 for the ignition starter switch functions, a module 24 for the immobilizer function that cooperates with a transponder incorporated in ignition key 25, a lock cylinder 26 and a protective cap 27 that also encloses an immobilizer antenna. FIG. 1b shows these individual elements of ignition starter switch 22. Ignition starter switch 22 comprising its individual elements is inserted as pre-fabricated modular unit into accommodation space 21 of support 5.

Figure 2:
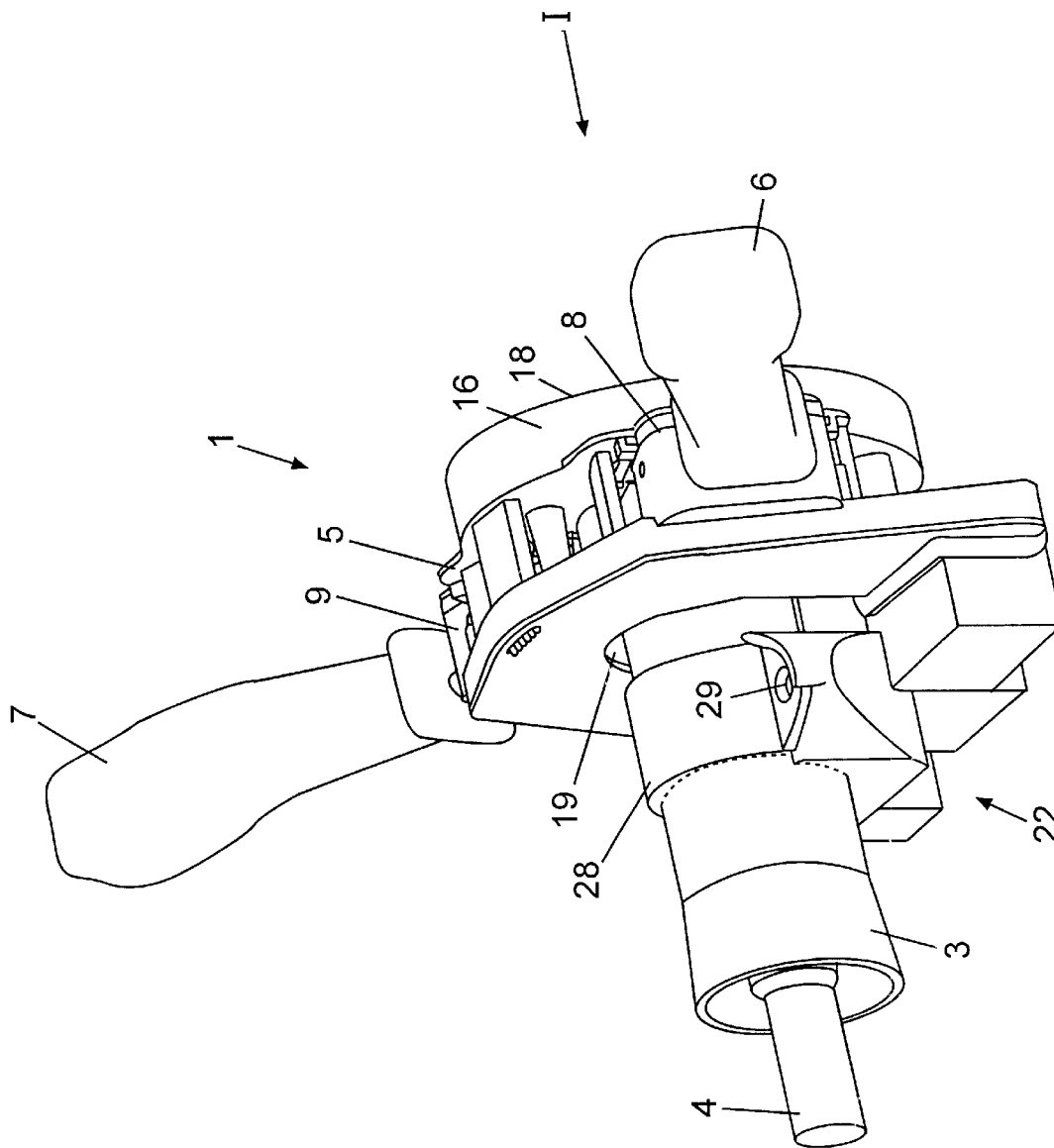
FIG. 2 is a perspective rear view of an alternative steering column switch in accordance with the invention herein.
Figure 2A:
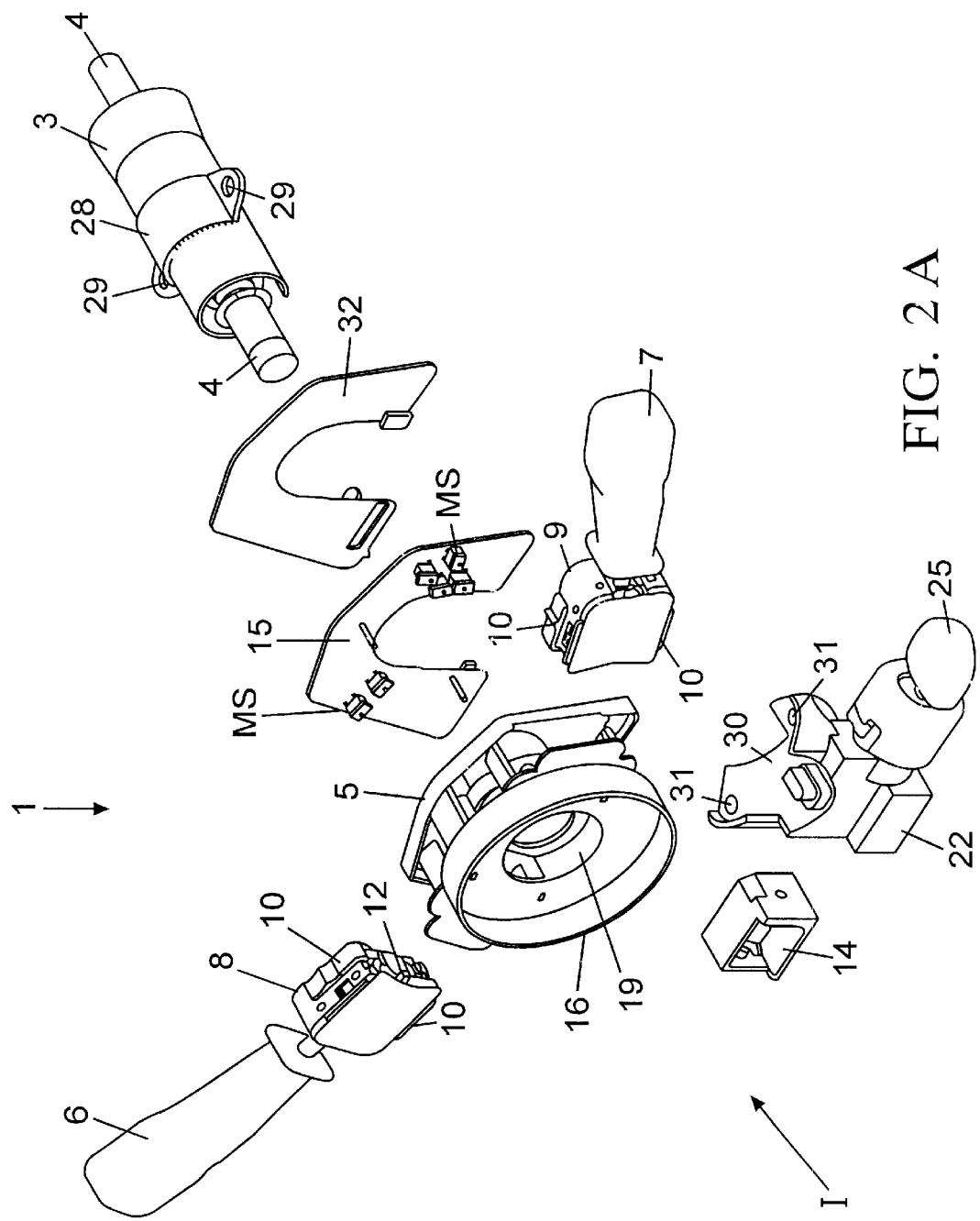
FIG. 2a is an exploded view of the steering column switch in opposite viewing direction of FIG. 2.
Figure 2:
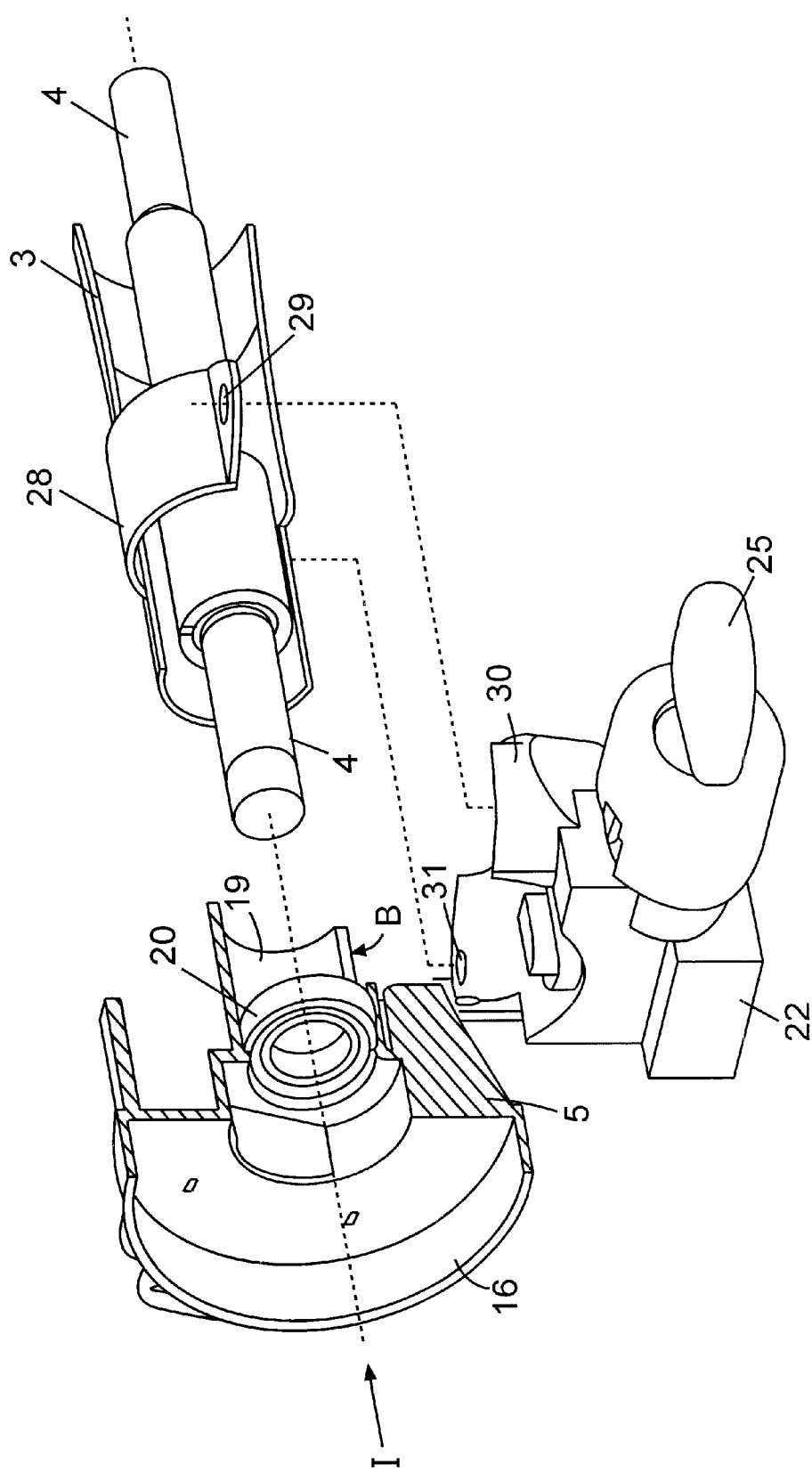

FIG. 2 and FIG. 2b show a form of embodiment of steering column switch 1, in which case ignition starter switch 22 is configured as component to be mounted separately from support 5. In so doing, adjacent support 5, a clamp 28 overlaps steering column tube 3 provided with passage holes 29 for not illustrated screws. An opposing clamp 30 with holes 31 adjoins ignition starter switch 22 and is rigidly connected to clamp 28 by means of screws at the time ignition starter switch 22 is mounted. In this form of embodiment of steering column switch 1 the reverse side of the printed circuit board is covered with a rear cover 32.

What is claimed is:

1. Automobile steering column switch comprising a support (5), which can be rigidly mounted to the steering column tube (3) of an automobile steering column (4), said support comprising at least one of a wiper switch (9), a blinker switch (8) and a driving light switch, characterized in that the support (5) also comprises a printed circuit board (15) provided with electrical contacts (MS) for transferring the switch functions of the at least one of the wiper switch (9), the blinker switch (8), the driving light switch, and an ignition starter switch (22), wherein the support (5) is configured as one piece and provided with an accommodation space (21) for accommodating the ignition starter switch (22), and wherein the switches (9, 8, 22) are mounted to the support (5) as a pre-assembled module to the steering column tube (3).

2. Steering column switch in accordance with claim 1, wherein the ignition starter switch (22) is mounted separately to the support (5) by means of a clamp connection (28, 30).

3. Steering column switch in accordance with claim 2, characterized in that the clamp connection (28, 30) consists of a clamp (28) overlapping the steering column tube (3) and a corresponding opposing clamp (30) adjoining the ignition starter switch (22).

4. Steering column switch in accordance with claim 3, characterized in that the clamp (28) overlapping the steering column tube (3) is connected by means of screws with the opposing clamp (30) adjoining the ignition starter switch (22).

5. Steering column switch in accordance with claim 1, characterized in that the at least one of the wiper switch (9), the blinker switch (8), and the driving light switch is mounted to the support (5) by means of a clip connection (12).

6. Steering column switch in accordance with claim 1, characterized in that the support (5) is rigidly mounted to the steering column tube (3) by means of a bayonet connection (B), whereby the support (5) rests on a ball-bearing (20) provided on the steering column (4).

7. Steering column switch in accordance with claim 1, characterized in that the electrical contacts of the printed circuit board (15) are configured as micro-switches (MS).

8. Steering column switch in accordance with claim 1, characterized in that the electrical contacts of the printed circuit board (15) are configured as switch contacts.

9. Steering column switch in accordance with claim 1, characterized in that the printed circuit board (15) is connected to a computer-controlled electronic automobile control system.

10. Steering column switch in accordance with claim 1, characterized in that the printed circuit board (15) is covered with a lid (16) mounted to the support (5).

11. Steering column switch in accordance with claim 1, characterized in that the ignition starter switch (22) comprises a cam control adapted to be activated with a key (25), said cam control acting on the electrical contacts (MS) on the printed circuit board (15).

12. Steering column switch in accordance with claim 1, characterized in that the support (5) incorporates an electrical transfer system (17) for an airbag device.

13. Steering column switch in accordance with claim 1, characterized in that an electronic module (14) is premounted to the support (5).

* * * * *